United States Patent [19]

Kovaleski

[11] Patent Number: 4,648,485

[45] Date of Patent: Mar. 10, 1987

[54] RADIAL SCOOP CONSTRUCTION

[75] Inventor: Stanley K. Kovaleski, South Windsor, Conn.

[73] Assignee: United Technologies Corporation, Hartford, Conn.

[21] Appl. No.: 784,088

[22] Filed: Oct. 4, 1985

[51] Int. Cl.⁴ .......................... F16N 7/26; F16N 7/36; F16N 25/04; F16C 3/14

[52] U.S. Cl. ..................................... 184/13.1; 184/26; 184/31; 384/404

[58] Field of Search ................... 184/5.1, 13.1, 26, 31; 384/393, 398, 399, 404, 465

[56] References Cited

U.S. PATENT DOCUMENTS

| | | | |
|---|---|---|---|
| 1,843,070 | 1/1932 | Shoemaker | 184/13.1 |
| 1,892,849 | 1/1933 | Rayfield | 184/24 |
| 1,936,101 | 11/1933 | Baits et al. | 184/13.1 |
| 2,237,900 | 4/1941 | Bundy | 184/13.1 |
| 2,449,227 | 9/1948 | Hobart | 184/13.1 |
| 2,980,209 | 4/1961 | Rabson | 184/11.1 |
| 3,195,682 | 7/1965 | Reneerkens | 184/11.1 |
| 3,307,655 | 3/1967 | Hatz | 184/11.1 |
| 3,635,311 | 1/1972 | Kaufman | 384/404 |
| 3,635,312 | 1/1972 | Kaufman | 184/11.1 |
| 3,796,283 | 3/1974 | Raby | 184/11.2 |
| 4,068,740 | 1/1978 | Quinn et al. | 184/11.1 |
| 4,327,950 | 5/1982 | Czuszak | 184/11.1 |

FOREIGN PATENT DOCUMENTS

| | | | |
|---|---|---|---|
| 477346 | 6/1929 | Fed. Rep. of Germany | 384/404 |
| 889194 | 2/1962 | United Kingdom | 384/398 |

Primary Examiner—Carlton R. Croyle
Assistant Examiner—Jane E. Obee
Attorney, Agent, or Firm—Charles A. Warren

[57] ABSTRACT

A scoop device for dividing oil in metered quantity in both directions from the scoop, in which the intake scoop passages deliver oil to a circumferential channel, from which it is discharged laterally into opposed grooves, the latter having notches in the outer sidewall thereof for metering the flow of oil from these grooves to the devices to be lubricated.

5 Claims, 7 Drawing Figures

RADIAL SCOOP CONSTRUCTION

DESCRIPTION

1. Technical Field

The invention relates to a radial scoop design for a gas turbine shaft capable of directing specific amounts of oil axially, forwardly and rearwardly from the scoop to lubricate bearings or seals surrounding the shafts and on opposite sides of the scoop.

2. Background Art

Presently, the radial scoops are used for directing oil in only one direction and thus all of the oil entering the scoop reaches the device to be lubricated. No division of the flow is required. Where a divided flow has been attempted the construction is such that the flow from some of the oil inlet scoop elements goes in one direction and oil from the other scoop elements goes in the other direction. If the scoop has, for example, four inlet elements and the oil is intended to be divided in a ratio other than three to one, the scoop will not be effective to produce the desired oil flow.

DISCLOSURE OF INVENTION

The present invention permits the division of flow within the scoop to any proportion desired, and the oil entering each of the scoop elements is divided in the desired proportion. This occurs regardless of the rotational speed and the number of scoop elements. The proportion of the flow forward and rearward can be readily modified as desired by a simple modification of the scoop device. The simplicity of the device results in a low manufacturing cost.

In accordance with the invention, the oil entering the inlet scoop elements flows in a circumferential channel defined by circumferentially extending sidewalls and the inner diameter surface of the scoop device. An axially extending ridge at the start of the channel just circumferentially beyond each scoop inlet prevents any spillback.

The oil in the channel is conveyed along the channel by centrifugal force. The end of the confined flow is defined by the absence of the sidewalls, and at this point the oil flow will diverge in both directions into annular grooves on opposite sides of the channel. These grooves are on the inner surface of the scoop device. The end of the channel is defined by an axial ridge formed in the inner surface of the scoop and contacting the shaft at that point to stop further circumferential flow of oil from the scoop upstream thereof. Appropriately sized notches in the outer sidewalls of the annular grooves meter the flow in each direction and thus assure the proper division of the flow in the two directions. For further precision of flow division, axial metering passages in the scoop may be provided to connect the opposite annular grooves and thus further ensure desired oil distribution to both sides.

The foregoing and other objects, features and advantages of the present invention will become more apparent from the following description of preferred embodiments and the accompanying drawings.

BEST MODE FOR CARRYING OUT THE INVENTION

Figure 1:
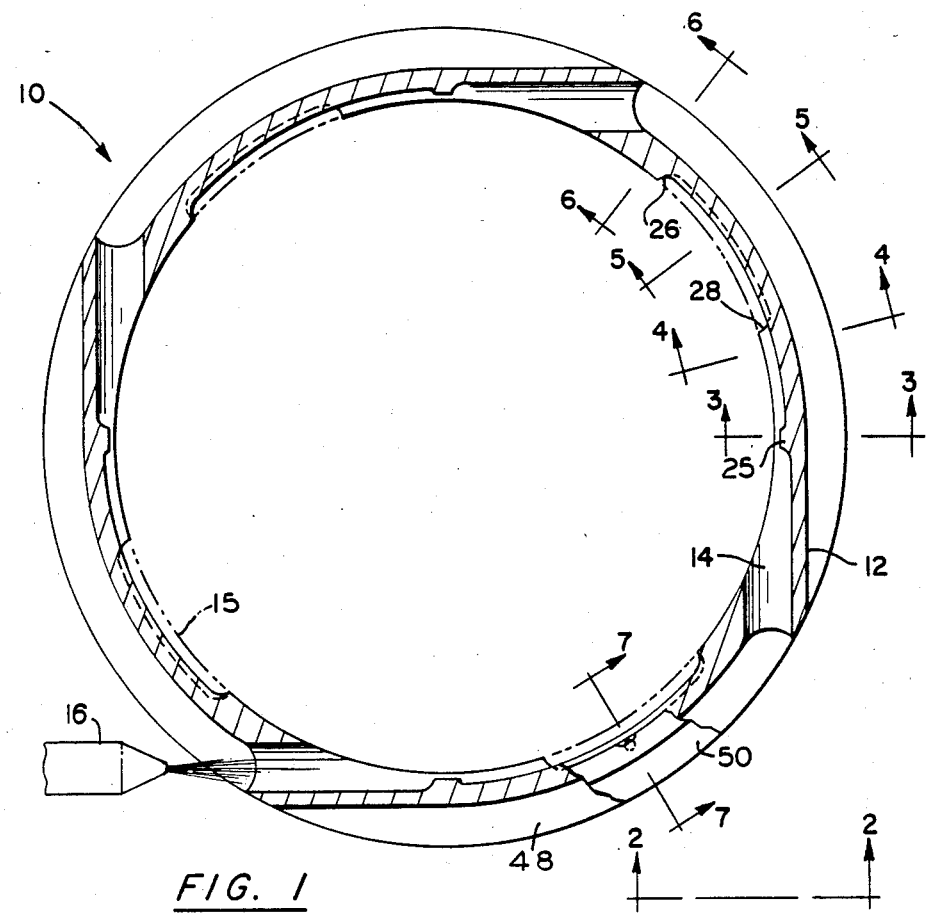
FIG. 1 is a sectional view through the scoop device with the shaft of the device shown in phantom.

Referring first to FIG. 1, the scoop device 10 is in the form of a ring and has circumferentially spaced scoop elements 12 with the passages 14 therein extending substantially tangential to the periphery of the shaft 15 shown in phantom of FIG. 1. This scoop device fits securely on the shaft since the surface of the shaft cooperates with the inner wall of the scoop device in controlling the oil flow.

Figure 2:
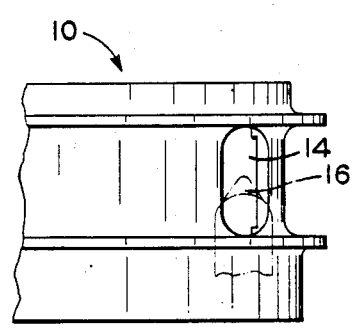
FIG. 2 is a view looking in the direction of the arrows 2—2 of FIG. 1 looking into the inlet scoop.
Figures 3, 4:
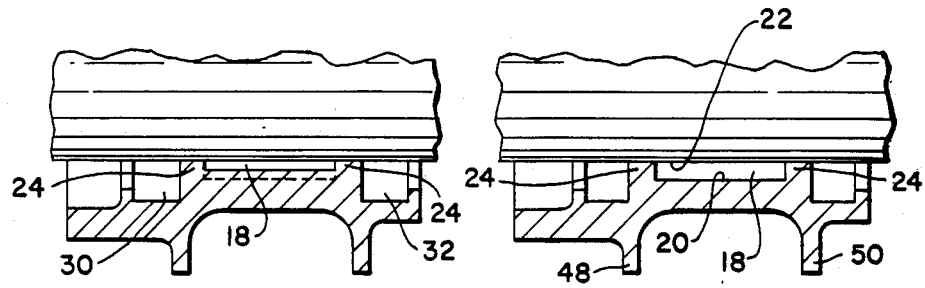
FIG. 3 is a sectional view along the line 3—3 of FIG. 1.
FIG. 4 is a sectional view along the line 4—4 of FIG. 1.

Oil enters the passages 14 from a fixed oil nozzle 16 external to the scoop and normally located by reason of engine configuration at an acute angle to the shaft axis as shown in FIG. 2. This angularity necessitates more precise division of the oil flow within the device as will be apparent. The oil entering the passage 14 is discharged into a channel 18, FIGS. 3 and 4, defined by the inner wall 20 of the device, the opposite surface 22 of the shaft and the circumferentially extending spaced side flanges 24 extending inwardly of the scoop to contact the shaft and defining the sidewalls of the channel.

Figures 5, 6:
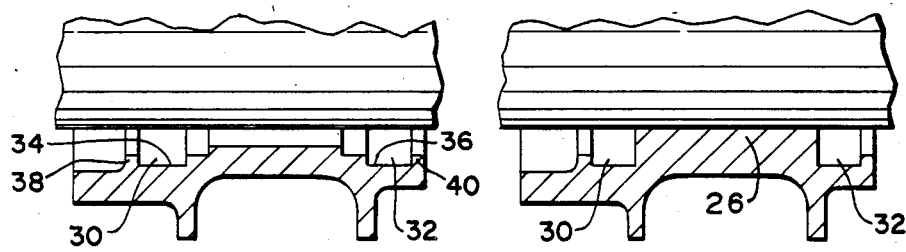
FIG. 5 is a sectional view along the line 5—5 of FIG. 1.
FIG. 6 is a sectional view along the line 6—6 of FIG. 1.

This channel extends from the inner end of one of the inlet passages 14 almost to the next passage 14, and is terminated by an axial rib 26 extending from the inner channel 18 and contacting the engine shaft thereby forming a wall beyond which the oil will not flow in the channel. Part way of this channel between the oil inlet 14 and the axial rib 26, the side flanges 24 terminate at 28, as shown in FIG. 1 and 5, to leave the sides of the channel missing, or, stated otherwise, to leave the bottom wall 20 of the channel unencumbered at its sides so that oil may flow out off of the surface 20 into opposed grooves 30 and 32 at opposite sides of the device. Each of these grooves has a bottom wall 34 and 36, respectively, and an outer sidewall defined by an inwardly extending rib 38 and 40, respectively, along or near the outer edges of the device. In this way, oil flows by centrifugal force from the channel in the area where the walls 24 are omitted and enters these grooves in substantially equal amounts.

Figure 7:
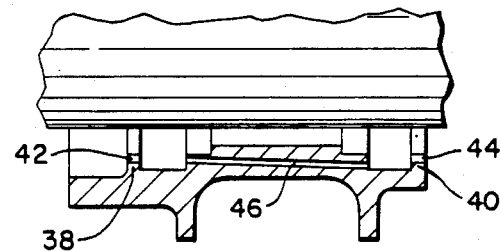
FIG. 7 is a sectional view along the line 7—7 of FIG. 1.

From these grooves in which the oil is held by centrifugal force in an annular pool surrounding the shaft, the oil escapes in the desired amount for lubricating the adjacent device which may be a bearing or a seal or other structure requiring a major quantity of oil through notches 42 and 44, FIG. 7, in the outer ribs 38 and 40, respectively. Obviously, the depth of these notches defines or determines the rate of flow of oil from the grooves 30 or 32 and thus the desired oil flow is metered in each direction.

As a further assurance of proper metering, the device may have one or more axial passages 46 extending therethrough and connecting the opposed grooves 30 and 32. This passage is desirably in line with the notches 42 and 44, although this is not in fact necessary. More than one passage may be provided if necessary to assure adequate flow of oil between the two grooves. The passage may be precisely axial or may be slanted slightly from the axial direction if it is desirable that the level of the pool in one groove be kept higher than the level in the other. As shown, the passage 46 would keep the level in the groove 30 higher than in the groove 32 because of the angular position thereof. With the end higher than one groove, the flow through the metered notch would be increased where one level was higher than the other. A rib 25 adjacent to the inner end of the inlet passage 14 forms the inlet end of the channel, and this rib serves as a dam for avoiding any backspill of oil.

In operation where the device is mounted on the turbine shaft, as the shaft rotates and carries with it the scoop device, oil in a jet spray from the nozzle is delivered through the inlet passages as they pass the nozzle and enters the channel. This oil is centrifigued against the inner wall of the scoop device and is caused to flow along the channel between the sidewalls until the sidewalls terminate. Then the oil flows both forwardly and rearwardly from the channel into the grooves which fill up with oil to such a point that the oil will flow through the metering notches toward the devices to be lubricated. Oil in the channel is forced into the grooves at the end of the channel if it has not been discharged previously by the axial rib 26 on the device. Division of oil between the grooves may be further controlled by the axial passage through the device. The outer surface of the scoop may have spaced outwardly extending ribs 48 and 50 for spacing purposes and/or for improving the rigidity of the device if desired.

It should be understood that the invention is not limited to the particular embodiments shown and described herein, but that various changes and modifications may be made without departing from the spirit and scope of this novel concept as defined by the following claims.

I claim:

1. A scoop device for metering the flow of oil in opposite directions along a turbine shaft for lubricating devices at opposite sides of the device, said device being a ring adapted to be positioned around and in contact with the surface of the shaft, said scoop device having:
   several tangentially arranged inlet passages for the admission of oil to the device,
   said device having inwardly extending spaced circumferentially extending ribs to define a channel, the outer wall being defined by the inner surface of the device located between said circumferentially extending ribs.
   an axial rib on the inner surface of the device at a point circumferentially spaced from one oil inlet passage and adjacent to the next oil passage to form one end of the channel,
   said spaced circumferentially extending ribs terminating at a point spaced from said axial rib to allow oil in the channel to flow laterally from said channel,
   said device having spaced grooves therein adjacent said circumferentially spaced ribs and in the sides of said circumferentially extending ribs opposite to the channel to receive oil from the channel,
   said grooves having outer sidewalls formed by other inwardly extending circumferential end ribs on said device, and
   each of said other end ribs having a notch in its inner edge for metering the flow of oil from the spaced grooves axially in both directions from the device.

2. A scoop device as in claim 1 in which there is another axially extending rib adjacent to the discharge end of the inlet passage to prevent a backflow of oil in the channel.

3. A scoop device as in claim 1 in which said spaced circumferentially extending ribs defining the channel therebetween extend inwardly of the device into contact with the shaft.

4. A scoop device as in claim 1 including passages through the device communicating at opposite ends with said grooves for the flow of oil between said grooves.

5. A scoop device as in claim 4 in which said passages are in axial alignment with the notches in said end ribs.

* * * * *